US009378229B1

(12) United States Patent  
Burger

(10) Patent No.: US 9,378,229 B1  
(45) Date of Patent: Jun. 28, 2016

(54) INDEX SELECTION BASED ON A COMPRESSED WORKLOAD

(75) Inventor: Louis Burger, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 1347 days.

(21) Appl. No.: 12/339,416

(22) Filed: Dec. 19, 2008

(51) Int. Cl.
    *G06F 7/00* (2006.01)
    *G06F 17/30* (2006.01)

(52) U.S. Cl.
    CPC .... *G06F 17/30312* (2013.01); *G06F 17/30336* (2013.01)

(58) Field of Classification Search
    CPC ................... G06F 17/30312; G06F 17/30336; G06F 17/30442
    See application file for complete search history.

(56) References Cited

U.S. PATENT DOCUMENTS

| | | | |
|---|---|---|---|
| 5,303,383 A | 4/1994 | Neches | |
| 5,640,584 A | 6/1997 | Kandasamy | |
| 5,864,842 A | 1/1999 | Pederson | |
| 5,884,299 A * | 3/1999 | Ramesh | G06F 17/30445 |
| 5,960,423 A | 9/1999 | Chaudhuri | |
| 6,366,903 B1 * | 4/2002 | Agrawal | G06F 17/30321 |
| 6,513,029 B1 | 1/2003 | Agrawal | |
| 6,618,729 B1 * | 9/2003 | Bhashyam | G06F 17/30324 |
| 6,738,755 B1 * | 5/2004 | Freytag | G06F 17/30469 |
| 6,738,756 B1 * | 5/2004 | Brown | G06F 17/30445 |
| 6,763,357 B1 * | 7/2004 | Deshpande | G06F 17/30457 |
| 6,801,903 B2 * | 10/2004 | Brown | G06F 17/30595 |
| 6,999,958 B2 * | 2/2006 | Carlson | G06F 17/30474 |
| 7,092,954 B1 * | 8/2006 | Ramesh | 707/714 |
| 7,155,428 B1 * | 12/2006 | Brown | G06F 17/30445 |
| 7,272,591 B1 * | 9/2007 | Ghazal | G06F 17/30442 |
| 7,840,555 B2 * | 11/2010 | Burger | G06F 17/30336 707/715 |
| 2003/0088546 A1 | 5/2003 | Brown | |
| 2003/0093408 A1 * | 5/2003 | Brown | G06F 17/30336 |
| 2007/0136386 A1 * | 6/2007 | Burger | 707/200 |
| 2009/0171890 A1 * | 7/2009 | Johnson | G06F 17/30516 |

OTHER PUBLICATIONS

Surajit Chaudhuri, et al., "Compressing SQL Workloads," ACM SIGMOD 2002, Madison, WI, pp. 1-12 (2002).
Oracle Corporation, "SQL Language: Reference Manual, Version 6.0," pp. 5-1 to 5-5, 5-96 to 5-97 (1990).
Douglas P. Brown et al., Teradata Solutions Group, "Real-Time Diagnostics Tools for Teradata's Parallel Query Optimizer, White-Paper," pp. 1-20 (Aug. 2000).
Eugene Wong et al., ACM Transactions on Database Systems, vol. 1, No. 3, "Decomposition-A Strategy for Query Processing," pp. 223-241 (Sep. 1976).
P. Griffiths Selinger et al., ACM, "Access Path Selection in a Relational Database Management System," pp. 23-34 (1979).
Masaru Kitsuregawa et al., Institute of Industrial Science, University of Tokyo, "Query Execution for Large Relations on Functional Disk System," pp. 159-167 (1989).

(Continued)

*Primary Examiner* — Daniel Kuddus
(74) *Attorney, Agent, or Firm* — Trop, Pruner & Hu, P.C.; Randy L. Campbell, Jr.

(57) ABSTRACT

A first workload that contains logged predicates contained in database queries is received. A subset of the predicates is selected based on costs associated with the predicates. A compressed workload is formed using the selected subset of the predicates. Indexes are then selected based on the compressed workload.

20 Claims, 2 Drawing Sheets

(56) References Cited

OTHER PUBLICATIONS

D.D. Chamberlin et al., "Sequel 2: A Unified Approach to Data Definition, Manipulation, and Control," IBM Journal of Research and Development, vol. 20, pp. 560-575 (Nov. 1976).

M.W. Blasgen et al., "On the Evaluation of Queries in a Relational Data Base System," IBM Research Report RJ 1745, pp. 1-44 (Apr. 1976).

M.W. Blasgen et al., "Storage and Access in Relational Data Bases," IBM Systems Journal, No. 4, pp. 363-377 (1977).

D.D. Chamberlin et al., "Views, Authorization, and Locking in a Relational Data Base System," National Computer Conference, pp. 425-430 (1975).

Office Action, U.S. Appl. No. 09/977,038, USPTO (Feb. 12, 2004).

Office Action (Restriction Requirement), U.S. Appl. No. 09/977,038, USPTO (Sep. 10, 2004).

Final Office Action, U.S. Appl. No. 09/977,038, USPTO (Dec. 1, 2005).

Decision on Appeal, U.S. Appl. No. 09/977,038, USPTO (Aug. 8, 2008).

Notice of Allowance, U.S. Appl. No. 09/977,038, USPTO (Nov. 4, 2008).

\* cited by examiner

INDEX SELECTION BASED ON A COMPRESSED WORKLOAD

BACKGROUND

A database is a collection of stored data that is logically related and that is accessible by one or more users. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

To extract data from, or to update, a relational table in a database management system, queries according to a standard database query language (e.g., Structured Query Language or SQL) are used. Examples of SQL queries include INSERT, SELECT, UPDATE, and DELETE.

To improve performance of database management systems, indexes can be defined. An index is a structure that provides relatively rapid access to the rows of a table based on the values of one or more columns. An index stores data values and pointers to the rows where those data values occur. An index can be arranged in ascending or descending order, so that the database management system can quickly search the index to find a particular value. The database management system can then follow the corresponding pointer to locate the row containing the value.

The advantage of having an index is that it speeds up the execution of database queries with search conditions that refer to an indexed column or columns. Generally, it is desired to create an index for columns that are used frequently in search conditions (such as in the WHERE clause of a SELECT statement).

Proper selection of indexes is important for optimal database performance. Typically, index selection is performed based on a workload that contains logged database queries. For a large database management system, the workload on which index selection is performed can be quite large. In many cases, a workload is defined by logging SQL queries that execute on a database management system during a given period of time. If the workload is large, then examining the workload can be computationally intensive, particularly since examining the workload involves detailed analysis of SQL queries.

SUMMARY

In general, according to an embodiment, a method includes logging predicates associated with database queries to form a workload, and selecting a subset of the predicates based on costs associated with the predicates. A compressed workload is then formed using the selected subset of the predicates, and selection of indexes can be performed based on the compressed workload.

Other or alternative features will become apparent from the following description, from the drawings, and from the claims.

DETAILED DESCRIPTION

In general, to enhance efficiency of index selection to select indexes for use in a database management system, compressed workloads are created. A compressed workload is created by finding those queries in an original, non-compressed workload (referred to as a "full workload") that are the most costly in terms of execution time, and including those queries in the compressed workload, while discarding other queries of the full workload. In some embodiments, the full workload can be formed by logging predicates associated with database queries. Next, a subset of the predicates in the full workload is selected based on costs associated with the predicates (for example, the top X % of predicates, where X is a predefined number, are selected). The compressed workload is then formed by identifying queries in the full workload that contain one or more of the selected subset of the predicates. Index selection can then be performed based on the compressed workload.

As used here, a "database management system" (or more simply, a "database system") refers to a set of coordinated database nodes (or just a single node) and associated database software that perform database-related tasks. The term "index" or "indexes" is intended to cover any index that can be used to enhance table access in a database system, including, as examples, a unique secondary index (USI), a non-unique secondary index (NUSI), a join index (JI), a primary index (PI), and so forth.

A primary index determines distribution of data across multiple database nodes of a database system. For example, hashing can be applied on the primary index of a given table row to produce a hash value to indicate on which database node the given table row is to be stored. Secondary indexes are data structures in which column values (from a table) are sorted (e.g., in ascending or descending order) and associated with row pointers. To access data in the table, the corresponding index can be consulted to quickly find the row(s) containing a particular data value (or data values).

Figure 1:
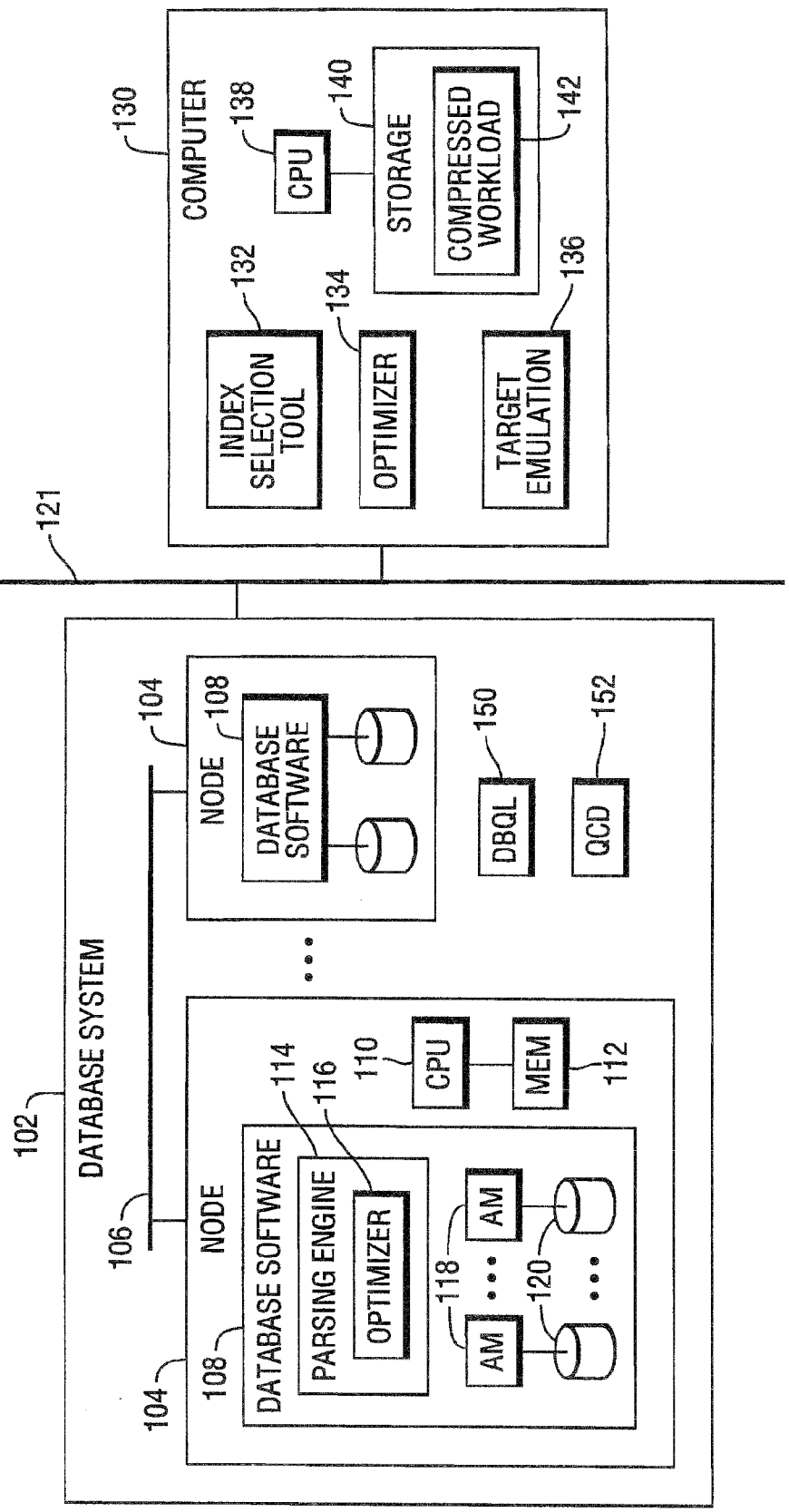
FIG. 1 is a block diagram of an exemplary system that includes a database management system and a computer in which index selection can be performed, according to an embodiment.

FIG. 1 illustrates an exemplary arrangement that includes a database management system 102 that is coupled over a network 121 to a computer 130. The database system 102 includes multiple database nodes 104, which are interconnected by an interconnect network 106. Each database node 104 can include a server computer and associated storage devices.

Each database node 104 includes database software 108 that is executable on one or more central processing units (CPUs) 110 of the node 104. The CPU(s) is (are) connected to memory 112. The database software 108 includes a parsing engine 114, which receives database queries and parses such received database queries (e.g., Structured Query Language or SQL queries). The parsing engine 114 includes an optimizer 116 that generates query plans in response to a database query, where the optimizer 116 selects the most efficient query plan from among multiple query plans. A query plan includes a number of steps for the query.

The parsing engine 114 can send the steps of the query plan to one or more of multiple access modules 118, which are also part of the database software 108. Each access module 118 is responsive to the steps received from the parsing engine 114 to perform one or more of the following tasks: inserts, deletes, or modifies content of tables; creates, modifies, or deletes definitions of tables; retrieves information from definitions and tables; and locks databases and tables. In one example, each access module 118 can be based on an access module processor (AMP) used in some TERADATA® database systems from Teradata Corporation.

Each access module 118 manages access of data in respective storage modules 120. A storage module 120 can be implemented with a physical storage device or with a logical storage device (e.g., a logical volume within one or more physical storage devices). The presence of multiple storage modules 120 allows a table to be distributed across the storage modules, where the content of the distributed table can be accessed concurrently by the access modules 118.

Although just one database system 102 is depicted in FIG. 1, it is noted that in alternative embodiments, multiple database systems can be employed.

FIG. 1 also depicts an index selection subsystem implemented in a computer 130 that is separate from the database system 102. In an alternative implementation, the index selection subsystem can be implemented in the database system 102. The computer 130 is connected to the network 121 to communicate with the database system 102. The computer 130 includes an index selection tool 132, an optimizer 134, and a target emulation tool 136 to emulate an environment of the database system 102. The index selection tool 132, optimizer 134, and target emulation tool 136 can be software tools executable on one or more CPUs 138 in the computer 130. The one or more CPUs 138 are connected to a storage 140.

In accordance with some embodiments, a compressed workload 142 can be created by the index selection tool 132 and stored in the storage 140. Index selection can be performed on the compressed workload to enhance efficiency, since the compressed workload is smaller than a regular workload that contains all logged database queries, such as all database queries logged within some predefined period of time. Note that the full workload retrieved from the database system 102 can also be stored in the storage 140.

The index selection tool 132 cooperates with the optimizer 134 to recommend a set of indexes based on the compressed workload 132. The indexes recommended can be primary indexes or secondary indexes.

As depicted in FIG. 1, the database system 102 can log activity (including database queries) in a database query log (DBQL) 150. In addition to storing queries, the DBQL 150 can also store information associated with the queries, such as account identifier, user identifier, client identifier, usage of objects, rows returned, start and finish times, and so forth. The DBQL 150 can include various DBQL tables, including a table to store the SQL statement of a query, a table to store query objects, a table to store query step information, a table to store explain information, and so forth.

Alternatively, instead of storing database activity in the DBQL 150, the database system 102 can store queries in a query capture database (QCD) 152. The QCD 152 is also made up of several tables, which can store captured query plans and other information.

The index selection tool 132 is able to retrieve the workload from the DBQL 150 or QCD 152. The index selection tool 132 can then compress the workload into the compressed workload 142, in accordance with some embodiments.

To create the compressed workload 142, the index selection tool 132 examines query conditions or "predicates" in the full workload and determines the subset that provides the best opportunity for improving workload performance. The compressed workload 142 is then formed by choosing the queries that contain one or more of the identified predicates.

Note that it is not uncommon for the performance of a given workload to be dominated by the cost of a few expensive queries; such queries are candidates to include in the compressed workload because they provide the most potential for improvement by proper selection of indexes. Moreover, although SQL queries (database manipulation language or DML statements such as SELECT, INSERT, UPDATE, and DELETE) include many different clauses, for the purpose of index selection the most relevant clauses are predicates in the SQL queries. A "predicate" specifies a condition of the SQL query that is to be satisfied to provide output data. Typically, a predicate is specified in the WHERE clause of a SQL query. Commercial cost-based query optimizers typically choose access paths and join algorithms used in a query execution plan by examining indexes defined on relevant predicates.

Also, it is noted that not all workload predicates are "indexable." An indexable predicate means that the predicate is potentially usable for indexed access. An example of an indexable predicate is a join predicate, such as T1.col=T1.col. An example of a non-indexable predicate is T3.col≠constant. The not-equal condition disqualifies the latter predicate from being considered for use as an index. Also, it is noted that those predicates that are used with an already-defined index in a current execution plan may not be as promising for performance improvement.

The above criteria can be used to further narrow the set of queries that should be included in a compressed workload.

Figure 2:
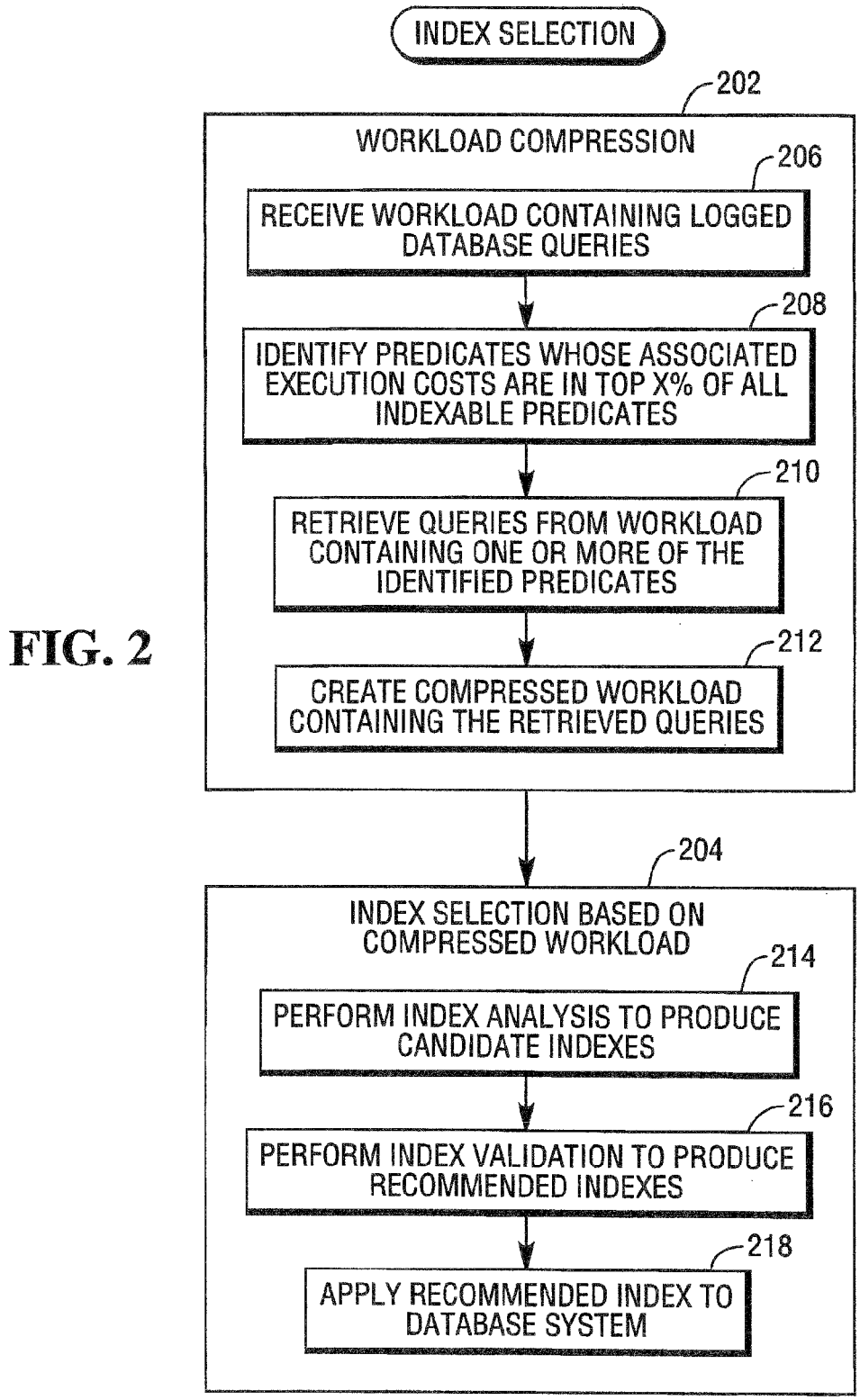
FIG. 2 is a flow diagram of a process of index selection using a compressed workload, according to an embodiment.

FIG. 2 illustrates an index selection procedure according to an embodiment. First, workload compression is performed (at 202). Next, indexes are generated (at 204) based on the compressed workload.

The workload compression (202) includes tasks 206, 208, 210, and 212. As part of the workload compression, a full (non-compressed) workload containing logged database queries is received (at 206). For example, the logged database queries can be received from the DBQL 150 or QCD 152 (FIG. 1). The queries may have been logged by the database system 102 during a given time interval.

The logged database queries in the full workload that is received contain the following predicate information. Predicates are represented as SQL text that can be retrieved and compared. Predicates are also categorized for potential index access (categorized as either indexable or not indexable) by the optimizer. Also, the predicates are normalized into a standard form that promotes the identification of equivalent predicates. Query-specific literals (constants) in the predicates are also removed. The literals (constants) are removed from predicates since two predicates are considered to be equivalent if they differ only by literals (constants). Also, execution step costs associated with the predicates are recorded. The costs can be estimated costs (estimated by the optimizer 116 in the database system 102) or actual costs (actual costs recorded after execution of the query containing a predicate).

Logging of the query information into the full workload can be performed at the database system 102 by using an INSERT EXPLAIN statement, for example, which causes predicate information to be stored in relation form in the QCD 152 (FIG. 1). A user can access the content of the QCD 152 using SQL SELECT statements. In alternative implementations, the predicate information can be logged or captured in other forms.

Next, the predicates whose associated execution costs are in the top X % of all indexable predicates are identified (at 208), where X is a predefined number. For example, a default value for X can be 10 or some other value. The top X % of indexable predicates represent the subset of predicates that provide the most room for performance improvement.

In one specific example where predicate information is stored in the QCD 152, the following SQL query can be submitted to obtain the top X % of all indexable predicates:

```
INSERT INTO TopIndexablePreds
  SELECT TOP 10 PERCENT PredicateText, SUM(QuerySteps.Cost),
  FROM QCD.Predicates, QCD.QuerySteps
  WHERE Predicates.StepId=QuerySteps.StepId
  AND Predicates.IndexableFlag='Y'
  AND QuerySteps.IndexUsed='N'/*optional*/
  GROUP BY PredicateText
  ORDER BY SUM(QuerySteps.Cost);
```

Note that in other implementations, other queries can be used to select predicates for use in creating the compressed workload.

In the example query above, the top X % is the top 10%, as specified in the SELECT clause. The top 10% of predicates are inserted into a table referred to as TopIndexablePreds in the example query above. The QCD 152 includes a Predicates table and a QuerySteps table. If IndexableFlag is set to true ("Y"), which indicates that the corresponding predicate is indexable, and the index has not been used ("IndexUsed=N"), then the corresponding PredicateText is selected. The selected predicates are ordered in the table TopIndexablePreds by query cost, as computed by SUM(QuerySteps.Cost).

Once the top X % of predicates are identified, queries containing one or more of the identified predicates are retrieved (at 210) from the full workload. A compressed workload is then created (at 212), where the compressed workload contains the retrieved queries.

Retrieving queries from the workload that contain one or more of the identified predicates can be accomplished using the following exemplary SQL query:

```
INSERT INTO CompressedWorkload
  SELECT Query.QueryId, Query.SQLText
  FROM QCD.Query
  WHERE Query.QueryId IN (
    SELECT QueryId
    FROM QCD.Query, QCD.Predicate
    WHERE Query.QueryId=Predicate.QueryId
    AND Predicate.PredicateText IN (
      SELECT PredicateText
      FROM TopIndexablePreds))
```

The compressed workload is stored in a table CompressedWorkload. The query information is retrieved from a Query table of the QCD 152, and the information from the Query table inserted into the CompressedWorkload table includes the query identifier (QueryId) and the query text (SQLText). The queries that are inserted into the CompressedWorkload table are those that contain one or more of the identified predicates contained in the TopIndexablePreds table.

Following workload compression (202) in which a compressed workload is created, index selection based on the compressed workload is performed (at 204). The index selection involves performing index analysis (at 214) on the compressed workload to produce candidate indexes. In the index analysis, the index selection tool 132 creates a list of potential indexes. Then, the index selection tool 132 simulates the performance of the compressed workload 142 in the emulated environment (generated from target emulation data imported by the target emulation tool 136) as if various combinations of the potential indexes exist. Based on the simulated performance, the index selection tool 132 produces the set of candidate indexes.

To perform target emulation, the target emulation tool 136 (FIG. 1) is able to export target emulation data from the database system 102. The target emulation data includes environment information, such as cost-related information, statistics, random samples, DDL (data definition language) statements, DML (data manipulation language) statements, actual database data, and so forth, from the database system 102. The environment information that is exported from the database system and imported into the computer 130 allows the computer 130 to emulate the environments of the database system 102.

Next, the index selection tool 132 performs (at 216) index validation, in which another simulation is performed to ensure that the optimizer 134 of the computer 130 (in the emulated target environment) will in fact pick the correct indexes if they are present. Performance of the index validation results in selection of recommended indexes from the set of candidate indexes. In index validation, the optimizer 134 can produce query plans with and without different candidate indexes. The costs of the query plans with and without the candidate indexes are compared, and the best-performing candidate indexes (those candidate indexes that may result in the most cost savings) are selected as the recommended indexes.

The candidate indexes that are not selected can be deleted. The recommended indexes are then applied (at 218) to the database system 102.

The various tasks discussed above can be performed by software (such as the index selection tool 132, optimizer 134, and/or target emulation tool 136 in FIG. 1). Instructions of such software are loaded for execution on a processor (such as CPUs 138 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer-implemented method executed by at least one processor, comprising:
    receiving a first workload that contains predicates contained in database queries, wherein the predicates are logged;
    selecting a subset of the predicates based on costs associated with the predicates, wherein a number of predicates in the subset of the predicates is less than a total number of the predicates, wherein the selection of the subset of predicates is performed prior to a start of a selection of indexes process;
    forming a compressed workload using the selected subset of the predicates;
    performing the selection of indexes process based on the compressed workload; and
    generating a response to at least one of the database queries based on the selected indexes.

2. The computer-implemented method of claim 1, wherein forming the compressed workload comprises selecting queries containing one or more of the predicates in the selected subset.

3. The computer-implemented method of claim 1, wherein a size of the compressed workload is smaller than a size of the first workload.

4. The computer-implemented method of claim 1, wherein receiving the first workload comprises receiving the first workload in which predicates have been normalized.

5. The computer-implemented method of claim 1, wherein receiving the first workload comprises receiving the first workload in which literals in predicates have been removed.

6. The computer-implemented method of claim 1, wherein receiving the first workload comprises receiving the first workload in which costs associated with steps of the database queries have been recorded.

7. The computer-implemented method of claim 1, wherein receiving the first workload comprises receiving the first workload that contains predicates contained in the database queries that are executed in a database system during a predefined time interval.

8. The computer-implemented method of claim 1, wherein selecting the subset of the predicates comprises selecting a top X % of predicates in terms of execution costs, where X is a predefined number.

9. The computer-implemented method of claim 1, wherein selecting the subset of the predicates comprises selecting indexable predicates and excluding non-indexable predicates.

10. The computer-implemented method of claim 1, further comprising applying the selected indexes to a database system.

11. An article comprising at least one computer-readable storage medium containing instructions that when executed cause at least one processor to:
receive a first workload that contains predicates contained in database queries, wherein the predicates are logged during execution in a database system;
select a subset of the predicates based on costs associated with the predicates, wherein a number of predicates in the subset of the predicates is less than a total number of the predicates, wherein the selection of the subset of predicates is performed prior to a start of a selection of indexes process;
form a compressed workload using the selected subset of the predicates;
perform the selection of indexes process for use by the database system based on the compressed workload; and
generate a response to at least one of the database queries based on the selected indexes.

12. The article of claim 11, wherein the at least one computer-readable storage medium contains instructions that when executed cause the at least one processor to select, from the first workload, queries containing one or more of the predicates in the selected subset to form the compressed workload.

13. The article of claim 11, wherein the at least one computer-readable storage medium contains instructions that when executed cause the at least one processor to receive the first workload in which literals in predicates have been removed.

14. The article of claim 11, wherein the at least one computer-readable storage medium contains instructions that when executed cause the at least one processor to receive the first workload in which costs associated with steps of the database queries have been recorded.

15. The article of claim 14, wherein the at least one computer-readable storage medium contains instructions that when executed cause the at least one processor to select the subset of the predicates that is a top X % of predicates in terms of the costs, where X is a predefined number.

16. The article of claim 11, wherein the at least one computer-readable storage medium contains instructions that when executed cause the at least one processor to select indexable predicates and exclude non-indexable predicates.

17. The article of claim 11, wherein the instructions are executed in a computer separate from the database system, and wherein the instructions when executed cause:
emulation of an environment of the database system in the computer, wherein performing selection of indexes is performed in the emulated environment.

18. A computer comprising:
a storage device to store a full workload; and
a processor in communication with the storage device, the processor configured to:
compress a full workload into a compressed workload through selection of a subset of most costly predicates from the full workload and selecting queries containing one or more of the predicates in the subset for insertion into the compressed workload, wherein selection of the subset is performed prior to a start of performance of a selection of indexes process; and
perform the selection of indexes process based on the compressed workload; and
generate a response to at least one of the queries based on the selected indexes.

19. The computer of claim 18, wherein the processor is further configured to select a subset of most costly predicates from the full workload and select queries containing one or more of the predicates in the subset for insertion into the compressed workload.

20. The computer of claim 18, wherein the processor is further configured to emulate an environment of the database system in the computer, wherein the selection of the indexes process is performed in the emulated environment.

* * * * *